US008568870B2

(12) United States Patent
Imai et al.

(10) Patent No.: US 8,568,870 B2
(45) Date of Patent: Oct. 29, 2013

(54) COATING FILM FOR BUILDING MATERIAL

(75) Inventors: Toshio Imai, Yokosuka (JP); Toshifumi Takahashi, Kakamigahara (JP); Yoshinori Hibino, Ama-gun (JP)

(73) Assignee: Nichiha Corporation, Nagoya-shi (JP)

( * ) Notice: Subject to any disclaimer, the term of this patent is extended or adjusted under 35 U.S.C. 154(b) by 646 days.

(21) Appl. No.: 12/276,241

(22) Filed: Nov. 21, 2008

(65) Prior Publication Data
US 2009/0142604 A1 Jun. 4, 2009

(30) Foreign Application Priority Data

Dec. 4, 2007 (JP) ................................ 2007-313602

(51) Int. Cl.
*B32B 21/08* (2006.01)
*B32B 27/20* (2006.01)
*B32B 27/30* (2006.01)
*E04B 1/62* (2006.01)

(52) U.S. Cl.
USPC ......... 428/328; 428/422; 428/522; 428/537.1

(58) Field of Classification Search
None
See application file for complete search history.

(56) References Cited

U.S. PATENT DOCUMENTS

| 5,905,114 A * | 5/1999 | Baumstark et al. ........... 524/801 |
| 5,939,182 A | 8/1999 | Huang et al. |
| 6,060,041 A | 5/2000 | Candau et al. |
| 6,177,373 B1 | 1/2001 | Sterte et al. |
| 6,368,668 B1 | 4/2002 | Kobayashi et al. |
| 2003/0096119 A1 * | 5/2003 | Kimura et al. ................. 428/412 |
| 2005/0266981 A1 * | 12/2005 | Nakajima et al. ............. 502/150 |
| 2006/0162617 A1 * | 7/2006 | Tanaka et al. ................. 106/436 |
| 2008/0118744 A1 * | 5/2008 | Kitamura ...................... 428/335 |

FOREIGN PATENT DOCUMENTS

| CA | 2 661 142 A1 | 10/2008 |
| CN | 1384152 A | 12/2002 |
| CN | 1505474 A | 4/2005 |
| CN | 1697866 A | 11/2005 |
| CN | 1984969 A | 6/2007 |
| EP | 614682 A1 * | 9/1994 |
| EP | 1 118 385 A1 | 7/2001 |
| EP | 1 462 169 A1 | 9/2004 |
| EP | 1 581 325 A1 | 7/2006 |
| JP | 2002-88275 A | 3/2002 |
| JP | 2004-107437 A | 4/2004 |
| JP | 2004352874 A * | 12/2004 |
| JP | 2006-8902 A | 1/2006 |
| JP | 2006-111680 A1 | 4/2006 |
| KR | 10-2007-0009035 A | 1/2007 |
| KR | 10-2007-0029377 A | 3/2007 |
| TW | 467943 B | 12/2001 |
| WO | WO 97/07069 A1 | 2/1997 |
| WO | WO 00/75087 A1 | 12/2000 |
| WO | WO 03/053576 A1 | 7/2003 |
| WO | WO 2005/118724 A1 | 12/2005 |

OTHER PUBLICATIONS

English translation of JP 2004-352874 A, Dec. 2004.*
English-Language Translation for RU-2143453-C1, published Dec. 27, 1999.
English-Language Translation for RU-2181997-C2, published May 10, 2002.
English-Language Translation for RU-2183499-C2, published Jun. 20, 2002.

* cited by examiner

*Primary Examiner* — Ramsey Zacharia
(74) *Attorney, Agent, or Firm* — Birch, Stewart, Kolasch & Birch, LLP

(57) ABSTRACT

A building material and a method for coating a substrate for the building material with a coating film having a variety of functions relating to an environment such as mildew resistance, deodorization, antibacterial activity and air purification in addition to the anti-staining effect by having an excellent hydrophilicity. The method for coating the substrate for a building material comprises the steps of; coating a coating material comprising a hydrophilic polymer and a photocatalyst on the substrate, and drying the coating material to form a coating film containing the photocatalyst, wherein the hydrophilic polymer is at least one selected from the group consisting of methyl silicate, liquid glass, colloidal silica, poly(meth)acrylate, and polytetrafluoroethylene graft-polymerized with sulfonic acid, and the photocatalyst is at least one selected from the group consisting of titanium oxide coated with zeolite, titanium oxide coated silica and titanium oxide coated with apatite.

5 Claims, No Drawings

COATING FILM FOR BUILDING MATERIAL

FIELD OF THE INVENTION

The present invention relates to a method for coating a substrate for a building material by forming a film comprising a photocatalyst on the surface of the substrate to form a building material used in the construction of a building such as a house or office building in an external wall, internal wall, roofing, flooring or the like.

DESCRIPTION OF THE RELATED ARTS

Conventionally, a building material used in an external wall, internal wall, roofing, flooring or the like, the following materials have been used: a ceramic building material containing cement as a primary component such as ALC panel (Autoclaved Lightweight aerated Concrete panel), wood chip cement board or fiber reinforced cement board; a composite board made of rubber, resin, metal, and/or ceramics which are reinforced with glass fiber; a fiberboard such as particleboard or insulation board; and a wooden board. As for a coating film used for external protection, it is known to provide an anti-staining effect by making the surface of the building material hydrophilic so that stains on the surface can easily flow off when the surface is rained upon. (for example, see Japanese Patent 3847048)

Recently, a variety of coating materials containing a different hydrophilic polymer have been used in order to provide a coating film with anti-staining effect. The building material comprising the substrate coated with a coating film is often piled up while being stored or transported. Therefore a good weather resistance for a long period is preferred in addition to the ability to dry quickly without stickiness. Currently, methyl silicate, liquid glass, colloidal silica, poly(meth)acrylate, and/or polytetrafluoroethylene (PTFE) graft-polymerized with sulfonic acid can be used as a hydrophilic polymer to meet the requirement described above.

However, even if such a hydrophilic polymer is applied on the surface of the substrate, only an anti-staining effect can be expected. Other effects such as mildew resistance, deodorization, antibacterial activity and air purification cannot be expected.

As people's awareness of environmental issues increases, so has the demand for a building material having a variety of functions relating to the environment such as mildew resistance, deodorization, antibacterial activity and air purification in addition to the anti-staining effect. It is believed that a hydrophilic polymer can have the above mentioned functions for coating the substrate to give a building material. The most adequate material for providing these functions is a photocatalyst. However, there are problems with conventional technology associated with the use of a photocatalyst which must be addressed. A photocatalyst-coated film must have a very high content of photocatalyst so that the photocatalytic reaction can be performed efficiently on the surface of the coated film. Since only the photocatalyst exposed on the surface can perform the reactions to give the desired effects, a very high content is needed to increase the amount of photocatalyst exposed on the surface. In preparing the coating film to have a high content of the photocatalyst exposed on the surface, there is the problem that the back surface (i.e., the other surface contacting the surface of the substrate or surface of another coating film on the substrate) of the film also has a high content of photocatalyst. This means that the photocatalytic oxidation reaction will occur not only on the surface (exposed to atmosphere) but also on the back surface, which causes deterioration of the surface of the base material of the substrate (or surface of another coating film on the substrate) which is in contact with the back surface. The deterioration results in flaking of the photocatalyst coating film or chalking on the surface of base material of the substrate. This phenomenon is called "a backside reaction of photocatalyst coating film." In view of this, a barrier coat should be applied, before applying the coating material of photocatalyst, to protect the base material of substrate from the backside reaction, which leads to an increase in the workload and cost and also in other facilities and space for the additional coating process. In addition, the photocatalyst will increase the hydrophilicity of the surface upon exposure to light (by e.g., reaction with water to produce surface hydroxyl groups or by reaction with organic compounds to form carbon dioxide and water). And yet it is difficult to check the hydrophilicity while manufacturing and shipping since the hydrophilicity is activated after being exposed to light. Further, building materials are often piled up while being stored or transported, which may cause a dent/scratch. It is difficult to repair the coating film since the photocatalyst must be retained on the surface of the building material.

SUMMARY OF THE INVENTION

The present invention has been conceived based on consideration of the above problems. The present invention provides a building material and a method for producing said building material comprising coating a substrate with a film containing a photocatalyst at the surface of the coating film so that the surface of the building material has a variety of functions relating to the environment such as mildew resistance, deodorization, antibacterial activity and air purification in addition to the anti-staining effect resulting from the excellent hydrophilicity of the polymer coating.

An aspect of the present invention is a method for forming a building material having a coating comprising the steps of; coating a coating material comprising a hydrophilic polymer and a photocatalyst on a substrate, and drying the coating material to form a coating film containing the photocatalyst, wherein the hydrophilic polymer is at least one material selected from the group consisting of methyl silicate, liquid glass, colloidal silica, poly(meth)acrylate, and polytetrafluoroethylene graft-polymerized with sulfonic acid, the photocatalyst is a titania sol, the content of the photocatalyst in the coating film ranges from 10 to 50 parts by mass in terms of titanium oxide per 100 parts by mass of hydrophilic polymer, either a static contact angle or a dynamic receding contact angle on the coating film is 30° or less while in a non-photoexcited state, and the methylene blue decomposition activity index of the coating film is 3.0 or more. It is preferable to use a coating material excellent in permeability. The static contact angle was found by measuring a contact angle of interface formed immediately after putting a water drop of 2 μm on the surface of the coating film while the coating film is kept horizontal. The dynamic receding contact angle was measured as follows: An initial water drop of 2 μm is put on a surface of the sample test piece which is kept horizontal, then after one minute, a 4 μm water drop is added to the initial drop and then, after one minute, 4 μm of water is removed from the water drop, and then after one additional minute, the contact angle is found by measuring a contact angle of the interface finally formed. The dynamic receding contact angle is used as a representative measure for expressing the degree of hydrophilicity of the coating film with good reproducibility. It was found that sufficient anti-staining effect could be obtained when either a static contact angle or a dynamic receding contact angle on the coating film is 30° or less while in a non-photoexcited state.

The substrate for the building material is an external wall, internal wall, roofing, flooring or the like, and can be made of a ceramic building material containing cement as a primary component such as ALC board, wood chip cement board or fiber reinforced cement board; a composite board made of rubber, resin, metal, and/or ceramics which are reinforced with glass fiber; a fiberboard such as particleboard or insulation board; and a wooden board.

The methylene blue decomposition activity index, defined in JIS R 1703-2, is used as a representative measure for determining the degree of the photocatalyst effect such as deodorization, antibacterial activity and air purification with good reproducibility. Methylene blue has the advantage that it rapidly decolorizes when a radical is generated in a photocatalyst reaction since methylene blue will not deteriorate directly by light irradiation, but will selectively react with a radical (free radical). Since mildew resistance, deodorization, antibacterial activity and air purification will result from the photocatalyst reaction, wherein radicals are generated, methylene blue decomposition is a good determinant of these effects. Therefore, the methylene blue decomposition activity index is used herein as a measure with good reproducibility for evaluating the photocatalyst effect. A sufficient photocatalyst effect is found when the methylene blue decomposition activity index is 3.0 or less.

In an aspect of this invention, the coating film comprising a photocatalyst is formed by applying a coating material containing a titania sol and a hydrophilic polymer which is at least one material selected from the group consisting of methyl silicate, liquid glass, colloidal silica, poly(meth)acrylate, and polytetrafluoroethylene graft-polymerized with sulfonic acid on the substrate for the building material, and drying it. The hydrophilicity of the surface of the coating film is not provided by the photocatalyst but is provided by the hydrophilic polymer. That is, the surface of the coating film is hydrophilic even in a non-photoexcited state, which is different from a conventional method where a photocatalyst coating material made of a mixture of photocatalyst and polymer is applied onto the substrate for the building material and dried, and then the surface becomes hydrophilic when the photocatalyst is photoexcited by light irradiation. The present invention is also distinct in that either a static contact angle or a dynamic receding contact angle is 30° or less even in a non-photoexcited state, and as such, the inventive coating film for the substrate for the building material has an excellent anti-staining effect while in a non-photoexcited state. Mildew resistance, deodorization, antibacterial activity and air purification can be obtained by using a highly reactive photocatalyst such as titania sol. Further, it was found that the undesirable backside reaction could be avoided when the content of the photocatalyst in the coating film ranges from 10 to 50 parts by mass of titanium oxide to 100 parts by mass of hydrophilic polymer. Also, sufficient mildew resistance, deodorization, antibacterial activity and air purification can be obtained by keeping methylene blue decomposition activity index of the coating film to 3.0 or more.

Another aspect of the present invention is a method for coating building material comprising the steps of: coating a coating material comprising a hydrophilic polymer and a photocatalyst, and drying the coating material to form a coating film comprising the photocatalyst, wherein the hydrophilic polymer is at least one material selected from the group consisting of methyl silicate, liquid glass, colloidal silica, poly(meth)acrylate, and polytetrafluoroethylene graft-polymerized with sulfonic acid; the photocatalyst is at least one material selected from the group consisting of titanium oxide coated on its surface with zeolite, titanium oxide coated on its surface with silica and titanium oxide coated on its surface with apatite; either a static contact angle or a dynamic receding contact angle on the coating film is 30° or less while in a non-photoexcited state; and the methylene blue decomposition activity index of the coating film is 3.0 or more. It is preferable to use a coating material excellent in permeability. In this aspect of the invention, the coating film comprising the photocatalyst is formed by applying a coating material comprising a titania sol and a hydrophilic polymer which is at least one material selected from the group consisting of methyl silicate, liquid glass, colloidal silica, poly(meth)acrylate, and polytetrafluoroethylene graft-polymerized with sulfonic acid on the building material, and drying it. The hydrophilicity of the surface of the coating film is not provided by the photocatalyst but is provided by the hydrophilic polymer, which is different from a conventional method. Also in this aspect of the invention, the coating film on the building material has either a static contact angle or a dynamic receding contact angle of 30° or less even while in a non-photoexcited state, which means that an excellent anti-staining effect can be obtained at non-photoexcited state similar to the aspect of the invention described above. In this aspect of the invention, however, use of the photocatalyst in the form of a mixture of at least one material selected from the group consisting of titanium oxide coated with zeolite, titanium oxide coated with silica or titanium oxide coated with apatite can provide effects of mildew resistance, deodorization, antibacterial activity and air purification without giving rise to the backside reaction. A common photocatalyst is an anatase-type titanium oxide, where the photocatalyst is exposed on the surface. When the photocatalytic reaction occurs on the surface, a highly-reactive oxide is generated and organic matter around the oxide is decomposed and deteriorated. For example, in the situation where the photocatalyst is dispersed as a pigment into a general-purpose paint, the organic polymer binder is decomposed by the photocatalyst. To avoid this decomposition, the surface of the photocatalyst is coated with inert material such as fine silica, zeolite or apatite so that the inert material on the surface functions as a buffer to avoid decomposing the organic polymer. If the buffer is not in the form of a film but in the form of a whisker or a grid, the greatly increased surface area can aid in the adsorption which is particularly required for deodorization and air purification in addition to acting as a buffer.

When the surface of the photocatalyst is covered with inert material having an adsorption function, the following reaction process can be realized. That is, the harmful material which is adsorbed on the inert material is gradually decomposed by the photocatalyst in the vicinity of the harmful material. In other words, the effects of deodorization, antibacterial activity and air purification can be obtained without decomposing the organic polymer. This also means that the photocatalyst does not contribute to the anti-staining effect, since the photocatalyst does not decompose the organic matter. There are many patents relating to this matter, for example, Japanese Patents, 3975270 and 3488496. Also, sufficient effects of mildew resistance, deodorization, antibacterial activity and air purification can be obtained by keeping the methylene blue decomposition activity index of the coating film to 3.0 or more.

In the case of using an aqueous coating material, there tends to be difficulty in forming a uniform coating on a water-repellent surface because the coating material tends to be repelled. The formation of a uniform coating film is difficult unless the surface tension on the water-repellent surface is lowered, which results in the coating film having poor hydrophilicity and photocatalyst effect. In another aspect of the present invention, the coating material further comprises a surfactant. That is, the coating material comprises a surfactant in a concentration of 0.01-5 mass % in terms of active ingredient. The surfactant can be any normal anionic surfactant, normal nonionic surfactant normal cationic surfactant, a mixture thereof. In this aspect of the present invention, the surfactant acts to lower the surface tension of the coating material to increase the affinity between the coating material and the surface of base material of substrate (or surface of another coating film). This leads to improved adherence between the coating film to be formed and the surface of the base material of the substrate. The effect caused by the surfactant is insufficient if the surfactant is less than 0.01 mass %. Also, the effect caused by the surfactant is saturated when the active ingredient of added surfactant exceeds 5 mass %, which simply raises the cost.

In the case of using an aqueous coating material, there tends to be difficulty in forming a uniform coating on a water-repellent surface because the coating material tends to be repelled. The formation of a uniform coating film is difficult unless the surface tension on the water-repellent surface is lowered, which leads to poor hydrophilicity and photocatalytic effects of the coating film. In another aspect of the present invention, the coating material further comprises alcohol in a concentration of 1-80 mass %, preferably 5-80 mass % based on the mass of the coating material. The alcohol is in a concentration of 1-80 mass % so that the surface tension of the coating material is lowered to increase the affinity between the coating material and the surface of base material of the substrate (or surface of another coating film) as well as the use of surfactant. This leads to improved adherence between the coating material and the surface of the base material of the substrate (or surface of another coating film). The effect caused by the alcohol is insufficient if the alcohol is less than 1 mass %. Also, the effect caused by the alcohol is saturated when the added alcohol exceeds 80 mass %, which simply raises the cost.

As to the thickness of the coating film, it is preferably 0.1-3 μm, more preferably 1-2 μm. By keeping the thickness of the coating film to be 0.1-3 μm, the surface resistance of the coating film is lowered. This enables the coating film surface to reduce dust and other stains to be gathered thereon and enables the surface of base material of the substrate (or the surface of another coating film on the substrate), which is contacting the coating film, to be protected for a long period. Consequently, thinning of the coating film as time passes can be suppressed. In other words, the building material comes to have high weather resistance. However, if the thickness of the coating film is less than 0.1 μm, the ability to reduce dust and other stains is weakened and the protection of the surface of the base material of the substrate becomes insufficient, which leads to a thinning of coating film. If the thickness of the coating film exceeds 3 μm, there is difficulty in performing a uniform coating for the coating film and the effects brought by increasing the thickness is saturated, which simply raises the cost.

According to the method for coating a substrate for a building material of the present invention, it is possible to provide a building material (comprising the coating film and the substrate) having a variety of functions such as mildew resistance, deodorization, antibacterial activity and air purification in addition to the anti-staining effect and the self-cleaning effect wherein stains can be washed off by falling rainwater in view of the excellent hydrophilicity. Also, in the inventive method, there is reduced backside reactions caused by the photocatalyst in the coating film, and as such, it is unnecessary to have a barrier coat as a protective layer between the substrate and the coating film. Consequently, the manufacturing becomes easier and mass production can be made, i.e., manufacturing cost can be reduced. In addition, the coating film on the surface of the substrate can function as a hydrophilic surface without the need for light, which makes it easier to check its hydrophilicity while manufacturing or shipping, and it makes it easier to apply the coating material, if necessary, to repair a part of surface coating film when damaged.

DETAILED DESCRIPTION OF THE INVENTION

A building material comprising a coating film and a substrate and a method for preparing said building material by coating a substrate with a coating material to form a coating film on the substrate of the present invention is described below.

As to hydrophilic polymer suitable for the coating material used in the method of coating building material of the present invention, methyl silicate, liquid glass, colloidal silica, poly (meth)acrylate, or polytetrafluoroethylene graft-polymerized with sulfonic acid can be used. It is also possible to use a mixture of these hydrophilic polymers which are compatible to provide other characteristics such as good adhesiveness or flexibility. Also a mixture of one or more of these hydrophilic polymers and other known resins can be used to the extent that hydrophilicity is not inhibited. Resins capable of forming a water-repellent film used for a substrate for a building material, include at least one of acrylic resin, polyester resin, silicon-modified acrylic resin, silicon resin, and fluororesin.

It was found that to realize the effects of mildew resistance, deodorization, antibacterial activity and air purification (not the self-cleaning effect (anti-staining) brought by a photocatalyst), not only should there be a photocatalytic reaction with high efficiency but also the harmful materials should be adsorbed onto the surface of the photocatalyst. These properties could not be realized by dispersing a photocatalyst with low specific surface area, since photocatalysts have poor dispersibility. These properties can be obtained by using a titania sol in a concentration wherein the backside reaction is not problematic, that is, the photocatalyst in the coating material ranges from 10 to 50 parts by mass in terms of titanium oxide per 100 parts by mass of hydrophilic polymer or by using titanium oxide having an adsorbing layer on the surface formed of materials such as zeolite, silica, or apatite.

As mentioned above, a surfactant can be used in the coating material comprising a hydrophilic polymer and photocatalyst. As a surfactant, any of normal anionic surfactant, normal nonionic surfactant and normal cationic surfactant can be used. As to the anionic surfactant, for example, a higher alcohol sulfate (sodium salt or amine salt), alkylallyl sulfonate (sodium salt or amine salt), alkyl naphthalene sulfonate (sodium salt or amine salt), alkyl naphthalene sulfonate condensate, alkyl phosphate, dialkyl sulfosuccinate, Rosin soap, or fatty acid salt (sodium salt or amine salt) can be used. As to the nonionic surfactant, for example, a polyoxyethylene alkyl ether, polyoxyethylene alkylphenol ether, polyoxyethylene alkyl ester, polyoxyethylene alkylamine, polyoxyethylene alkylolamine, polyoxyethylene alkylamide, sorbitan alkyl ester, or polyoxyethylene sorbitan alkyl ester can be used. As to the cationic surfactant, for example, an octadecylamine acetate, imidazoline derivative acetate, polyalkylenepolyamine derivative or polyalkylenepolyamine derivative salt, octadecyltri-methylammonium chloride, trimethylaminoethyl alkylamide halogenide, alkylpyridinium sulfate, or alkyltrimethylammonium halogenide can be used. The surfactant can be used in a mixture of two kinds or more. The aforementioned surfactants are examples and surfactants available in the present invention are not limited to the examples. As mentioned above, when the surfactant is used in the concentration of 0.01-5 mass % (in terms of active ingredient), the surface tension of the coating material can be reduced which increases the affinity between the coating material and the surface of the substrate (or surface of another coating film) for the building material.

As mentioned above, an alcohol can be added to the coating material comprising a hydrophilic polymer and photocatalyst. As to the alcohol, lower alcohols such as methyl alcohol, ethyl alcohol, isopropyl alcohol, butyl alcohol, or normal propyl alcohol can be used; and higher alcohols such as hexyl alcohol pentyl alcohol, or octanol can be used. The alcohol can be used in a mixture of two kinds or more. The alcohols mentioned are examples and the present invention is not limited to these examples. The alcohol can further comprise a glycol-based solvent such as ethylene glycol, diethylene glycol, triethylene glycol, propylene glycol or dipropylene glycol; glycol-ether-based solvent such as ethylene glycol monomethyl ether, ethylene glycol monoethyl ether, ethylene glycol monobutyl ether, ethylene glycol monohexyl ether, propylene glycol monomethyl ether, propylene glycol monoethyl ether, propylene glycol monobutyl ether, or propylene glycol monohexyl ether; and ether-based solvent such as ethylene glycol monobutyl ether acetate, or diethylene glycol monobutyl ether acetate. As described above, the alcohol can be used in a concentration of 1-80 mass % (in terms of active ingredient) to reduce the surface tension of the coating material so as to increase the affinity between the coating material and the surface of the base material of the substrate (or surface of another coating film). It is also possible to adjust the drying sequence of the coating film by using a mixture of two kinds or more of the alcohol, for example, a mixture of a lower alcohol and higher alcohol.

In this invention, the aforementioned coating material is coated onto the surface of the substrate for the building material and dried to form a coating film comprising a photocatalyst on the surface of the substrate. As a coating method, for example, the following are available. That is, a spray coating method where the coating is made by spraying coating material from a spraying nozzle; a flow-coating method where a coating material is overflowed from a coating material reservoir to form a falling film through which an object to be coated is passed; a roll coating method where a rotating drum is partly dipped in a coating material pan to form a liquid coating material layer on the surface of the roll and the liquid coating material layer is transferred to an object to be coated; a brush coating method where an object is brushed with a coating material; an electrostatic coating method where an object to be coated is connected to an anode and a coating atomizer is connected to a cathode to form an electrostatic field therebetween, where an atomized coating material with negative charge is efficiently adsorbed on the object with opposite charge; a bell coating method where a coating material is fed to a high speed rotating bell-shaped rotor to form an atomized coating material with an electric charge so as to fly to the object from the edge of the bell-shaped rotor by centrifugal force; or a rotary spray coating wherein a coating material is sprayed from a spray nozzle spinning horizontally in a circle over the path along which an object to be coated is fed. It is preferable to preheat the substrate to 40-100° C. before coating, more preferably to 50-80° C. The coated substrate can be dried at room temperature, and/or it can be dried by heating using a dryer and/or it can be dried with air using a blower. It is also preferable to apply the coating material so that the thickness of obtained coating film becomes 0.1-3 μm.

As described above, the coating film formed on the substrate, has either a static contact angle or a dynamic receding contact angle of 30° or less at a non-photoexcited state, which means that the building material (comprising the coating film and substrate) has excellent anti-staining effects even while in a non-photoexcited state. Also, the methylene blue decomposition activity index is 3.0 or more giving the building material excellent mildew resistance, deodorization, antibacterial activity and air purification. Further, keeping the thickness of the coating film at 0.1-3 μm makes the surface resistance of the coating film. This enables the coating film surface to have reduced dust and other stains thereon and enables the surface of the base material of the substrate (or surface of another coating film on the substrate) which is contacting the coating film to be protected for a long period. Consequently, thinning of the coating film over time can be suppressed. In other words, the building material comes to have high weather resistance.

EXAMPLES

Examples of building materials and methods for coating a substrate with a coating film to form said building materials of the present invention are described below in detail.

Example 1

In this example, methyl silicate is used as hydrophilic polymer and a titania sol is used as photocatalyst. The coating material is prepared so that the mass ratio of the hydrophilic polymer to photocatalyst is 100 to 10. The composition of the coating material (in mass %) is shown below.

| | |
|---|---|
| methyl silicate (MS57 ™ manufactured by Mitsubishi Chemical Corporation) | 3 |
| titania sol (STS ®-100 manufactured by ISHIHARA SANGYO KAISHA, LTD) | 1.8 |
| hardening acceleration catalyst (dibutyltin diacetate 1% solution) | 0.2 |
| Water | 80 |
| Methanol | 15 |

MS57™ is expected to be reduced to 60% in mass as it is dried because of the dealcoholization reaction. STS®-100 (photocatalytic titanium oxide aqueous sol, $TiO_2$ concentration=20 wt %, X-ray diameter=5 nm, pH=1.5, contains 10% of nonvolatile component). Consequently, the above composition results in a mass ratio of hydrophilic polymer to photocatalyst, 100 to 10. The substrate for testing the anti-staining effect of the invention is prepared by applying an aqueous styrene-acrylic coating material (for coloring) onto the surface of rectangular (50 mm×40 mm) fiber reinforced cement board. The color tone is adjusted to match CN-95 defined in "Standard Paint Colors" pocket edition issued by Japan Paint Manufacturers Association. A sample test piece for checking the anti-staining effect is prepared by applying the coating material having the composition described above (anti-staining treatment liquid) onto the substrate so as to have 50 g/m² coating weight and drying the coated substrate at 60° C. for 20 minutes.

Example 2

In this example, methyl silicate is used as a hydrophilic polymer and a titania sol is used as photocatalyst. The coating material of the invention is prepared by making a hydrophilic polymer comprising a photocatalyst so that mass ratio of hydrophilic polymer to photocatalyst is 100 to 50. The composition of the coating material (in mass %) is shown below.

| | |
|---|---|
| methyl silicate (MS57 ™ manufactured by Mitsubishi Chemical Corporation) | 3 |
| titania sol (STS ®-100 manufactured by ISHIHARA SANGYO KAISHA, LTD) | 9 |
| hardening acceleration catalyst (dibutyltin diacetate 1% solution) | 0.2 |
| Water | 72.8 |
| Methanol | 15 |

A sample test piece is prepared in the same manner as in Example 1.

Example 3

In this example, polytetrafluoroethylene graft-polymerized with sulfonic acid is used as hydrophilic polymer and titanium oxide coated on its surface with apatite is used as photocatalyst. The composition of the coating material (in mass %) is shown below.

| | |
|---|---|
| polytetrafluoroethylene (PTFE) graft-polymerized with sulfonic acid (20% Nafion ® DE2020 manufactured by E. I. du Pont de Nemours and Company in USA) | 8 |
| titanium oxide coated on its surface with apatite (NTB ®-100 manufactured by Showa Denko K.K.) | 2 |
| Water | 75 |
| Methanol | 15 |

A sample test piece is prepared in the same manner as in Example 1.

Example 4

In this example, a surfactant is used in place of the alcohol-based solvent. The composition of the coating material (in mass %) is shown below.

| | |
|---|---|
| polytetrafluoroethylene (PTFE) graft-polymerized with sulfonic acid (20% Nafion ® DE2020 manufactured by E. I. du Pont de Nemours and Company in USA) | 8 |
| titanium oxide coated on its surface with apatite (NTB ®-100 manufactured by Showa Denko K.K.) | 2 |
| Water | 89 |
| surfactant ("POLYFLOW KL600" ™ manufactured by KYOEISHA CHEMICAL Co., LTD | 1 |

A sample (test piece) is prepared in the same manner as in Example 1.

Comparison Example 1

The same coating material as in Example 1 is used except that the photocatalyst is replaced with water. A sample (test piece) is prepared in the same manner as in Example 1.

Comparison Example 2

The same coating material as in Example 3 is used except that the photocatalyst is replaced with water. A sample (test piece) is prepared in the same manner as in Example 1.

Comparison Example 3

This comparison example uses a conventional photocatalyst. In this comparison example, ethyl silicate is used as hydrophilic polymer and a photocatalyst powder is used to prepare a common photocatalyst coating material where the mass ratio of hydrophilic polymer to photocatalyst is 100 to 60. The composition of the coating material (in mass %) is shown below.

| | |
|---|---|
| ethyl silicate ("Ethyl silicate 48" ™ manufactured by COLCOAT CO., Ltd) | 4 |
| photocatalyst powder ("ST-01" ™ manufactured by ISHIHARA SANGYO KAISHA, LTD) | 1.2 |
| hardening acceleration catalyst (dibutyltin dilaurate 1% solution) | 0.1 |
| Isopropanol | 96 |

Ethyl silicate 48™ is expected to be reduced to 48% by mass as it is dried because of the dealcoholization reaction. ST-01™ (a photocatalytic titanium oxide powder, X-ray diameter=7 nm, Surface Specific Area=300 m$^2$/g). Consequently, the above composition has a mass ratio of hydrophilic polymer to photocatalyst of 100 to 60. A sample (test piece) is prepared in the same manner as in Example 1.

Comparison Example 4

The same coating material as in Example 4 is used except that the surfactant is replaced with water. This coating material does not contain either an alcoholic solvent or surfactant. The sample test piece is prepared in the same manner as in Example 1.

The test results are shown in Table 1 below.

TABLE 1

| | Example 1 | Example 2 | Example 3 | Example 4 | Comparison Example 1 | Comparison Example 2 | Comparison Example 3 | Comparison Example 4 |
|---|---|---|---|---|---|---|---|---|
| water contact angle at non-photoexcited state | 30° | 30° | 25°* | 25°* | 30° | 25°* | 86° | 90°* |

TABLE 1-continued

|  | Example 1 | Example 2 | Example 3 | Example 4 | Comparison Example 1 | Comparison Example 2 | Comparison Example 3 | Comparison Example 4 |
|---|---|---|---|---|---|---|---|---|
| decomposition activity index | 6.0 | 12.0 | 11.6 | 11.6 | 0.0 | 0.0 | 12.0 | 2.0 |
| backside reaction | Nothing | nothing | nothing | nothing | nothing | nothing | observed | nothing |
| self-cleaning effect | 0.3 | 0.2 | 0.3 | 0.3 | 0.3 | 0.3 | 2.0 | 4.1 |
| antibacterial effect | 3.0 | 4.2 | 3.5 | 4.0 | 0.0 | 0.0 | 3.0 | 0.5 |
| $NO_x$ removal | 0.6 | 0.8 | 0.5 | 0.6 | 0.0 | 0.0 | 0.6 | 0.1 |

As to data of water contact angle at non-photoexcited state, data with symbol * represents a dynamic receding contact angle and data without symbol * represents a static contact angle.

Measurement of water contact angle in a non-photoexcited state.

With respect to the measurement of water contact angle in a non-photoexcited state, a static contact angle is measured for inventive examples 1 and 2, and for comparison examples 1 and 3. A static contact angle is measured by measuring a contact angle of an interface formed immediately after putting a water drop of 2 μm on the surface of the sample while the test piece is kept horizontal. For inventive examples 3 and 4, and comparison examples 2 and 4, a dynamic receding contact angle is measured. The dynamic receding contact angle is measured as follows. An initial water drop of 2 μm is put on the surface of the sample test piece as it is kept horizontal, then after one minute later, 4 μm of water drop is added to the initial drop, and after another one minute later, 4 μm of water is removed by suction from the water drop, and then after one further minute later, the contact angle is measured at the interface which is formed.

Decomposition Activity Index

Methylene blue decomposition activity index is obtained according to the standard JIS R 1703-2.

Occurrence of Backside Reaction

Whether backside reaction occurred or not is determined as follows. First, the surface of the sample test piece is exposed to black light of 7 mW/cm² for 168 hours, then the presence or absence of chalking is checked by wiping the surface using a black cloth. If no chalking is found, then adhesiveness is checked by a cross-cut Sellotape® separation test. If the result of 100/100 is obtained, then no backside reaction will have occurred. Contrarily, when chalking or cloudiness is observed and the result of cross-cut Sellotape® separation test is worse than 100/100, then backside reaction will have occurred.

Measurement of Self-Cleaning Effect

A sample test piece is placed to be exposed in an outdoor location at a southern slope with a sloping angle of 10° in Osaka Sakai Senboku Industrial Park for two months. Then the Lab color difference ΔE between the exposed sample test piece and non-exposed reference piece is measured. If ΔE is within 0.5, a stain is invisible to the normal naked eye. If ΔE exceeds 3.0, the stain is clearly visible. Thus, the sample test piece with which ΔE exceeds 3.0 is categorized as having no self-cleaning effect.

Antibacterial Test

A test for evaluating the antibacterial effect of photocatalyst products is defined in JIS R1702. In accordance with the JIS standard, antibacterial effect ΔR of photocatalyst antibacterial product is obtained based on the change of the number of living bacteria, Staphylococcus aureus, after 8-hour light irradiation. Generally, it is preferable to have 2.0 or more of the ΔR value for the antibacterial product.

NOx Removal

The test for comparative evaluation of NOx removal performance of photocatalyst product are defined in JIS R1701-1. The NOx decomposition amount is obtained substantially based on the JIS standard except for the gas flow rate of NOx gas, that is, NOx gas flow rate is set to 0.5 l/min. in this test while the exact gas flow rate defined by the JIS is 3.0 l/min. The measurement result is expressed by the decomposition amount in units of μmol. If the value of the decomposition amount becomes larger, the NOx removal performance is higher.

Results

With respect to the water contact angle while in a non-photoexcited state, examples 1-4 and comparison examples 1-2 show that both the static contact angle and the dynamic receding contact angle are 30° or less. This means that the surface of the coating film is hydrophilic while in a non-photoexcited state. Comparison examples 3 and 4 show the dynamic receding contact angle are far larger than 30°, which means that the surface of the coating film is not hydrophilic while in a non-photoexcited state. With respect to the backside reaction, only comparison example 3 shows a backside reaction and no other examples shows a backside reaction. With respect to the self-cleaning effect, examples 1-4 and comparison examples 1-2 display a self-cleaning effect, but comparison examples 3-4 do not. Although comparison example 3 has a coating film containing photocatalyst, it also shows poor hydrophilicity at an initial stage (while in a non-photoexcited state). Thus, stains are seen at an initial stage, which leads to a poor self-cleaning effect. Comparison example 4 also has a poor self-cleaning effect, which is most likely caused by an imperfect forming of the hydrophilic coating film on the base material having high water repellency. Further, with respect to the decomposition activity index, antibacterial effect and $NO_x$ removal, good results are seen for examples 1-4 and comparison example 3, but not for comparison examples 1, 2 and 4. In view of the above, it can be stated that each of examples 1-4 have a coating film which is hydrophilic while in a non-photoexcited state and in view of the presence of a photocatalyst, the building material has a self-cleaning effect, mildew resistance, deodorization, antibacterial activity and air purification (except hydrophilicity caused by photoexcitation). Further examples 1-4 do not show a backside reaction. Although comparison example 3, which has a coating film made of a persistent binder and a photocatalyst, has a photocatalyst effect such as self-cleaning effect, comparison example 3 also has defects that the surface of the coating film is not hydrophilic while in a non-photo-excited state and a backside reaction occurs.

As described above, the method for coating a substrate for a building material of the present invention can provide a hydrophilic building material which has excellent mildew resistance, deodorization, antibacterial activity and air purification in addition to anti-staining effect and a self-cleaning effect wherein a stain on the surface can easily flow off when the surface is exposed to rainwater. Also, the inventive method gives no backside reaction, which makes it unnecessary to have a protecting layer of barrier coat as an undercoating. The ease of manufacturing the inventive building material enables mass production while reducing manufacturing costs. Further, the coating film on the surface of the substrate can have hydrophilicity without receiving light irradiation. This makes it easy to perform checking of the hydrophilicity at manufacturing and shipping and to perform a simple repair of the coating when the coating film is damaged with a dent/scratch.

What is claimed is:

1. A building material comprising:
   a substrate; and
   a coating film disposed on the substrate, wherein
   said coating film comprises a hydrophilic polymer and a photocatalyst,
   the hydrophilic polymer is polytetrafluoroethylene graft-polymerized with sulfonic acid; the photocatalyst is titanium oxide coated with apatite, and
   the coating film has either a static contact angle or a dynamic receding contact angle of 30° or less while in a non-photoexcited state, and a methylene blue decomposition activity index of 3.0 or more.

2. The building material according to claim 1, wherein the substrate is a ceramic building material comprising cement as a primary component, a composite board, a fiberboard or a wooden board.

3. The building material according to claim 2, wherein the substrate is an ALC board; wood chip cement board; fiber reinforced cement board; a composite board made of rubber, resin, metal, and/or ceramic reinforced with glass fiber; a particleboard; insulation board; or a wooden board.

4. The building material according to claim 1, further comprising a film comprising an aqueous styrene-acrylic coating material, wherein
   the film comprising the aqueous styrene-acrylic coating material is disposed on the substrate and beneath the coating film.

5. The building material according to claim 1, wherein the content of the titanium oxide coated with apatite in the coating film ranges from 10 to 50 parts by mass in terms of titanium oxide per 100 parts by mass of polytetrafluoroethylene graft-polymerized with sulfonic acid.

* * * * *